United States Patent
Li et al.

(10) Patent No.: US 12,042,092 B2
(45) Date of Patent: Jul. 23, 2024

(54) SMOKE EVACUATING FRYER

(71) Applicant: SEB S.A., Ecully (FR)

(72) Inventors: Tong Li, Guangdong (CN); Zhiquan Tian, Guangdong (CN); Zuocheng Lu, Guangdong (CN)

(73) Assignee: SEB S.A. (FR)

( * ) Notice: Subject to any disclaimer, the term of this patent is extended or adjusted under 35 U.S.C. 154(b) by 769 days.

(21) Appl. No.: 17/284,180

(22) PCT Filed: Oct. 10, 2019

(86) PCT No.: PCT/CN2019/110291
§ 371 (c)(1),
(2) Date: Apr. 9, 2021

(87) PCT Pub. No.: WO2020/073941
PCT Pub. Date: Apr. 16, 2020

(65) Prior Publication Data
US 2021/0330125 A1    Oct. 28, 2021

(30) Foreign Application Priority Data

Oct. 12, 2018 (CN) .......................... 201811189379.X

(51) Int. Cl.
*A47J 37/12*    (2006.01)

(52) U.S. Cl.
CPC ....... *A47J 37/1276* (2013.01); *A47J 37/1295* (2013.01)

(58) Field of Classification Search
CPC ........................................ A47J 37/1276–1295
See application file for complete search history.

(56) References Cited

U.S. PATENT DOCUMENTS

| 2004/0007138 A1* | 1/2004 | Payen | A47J 37/128 |
| | | | 99/403 |
| 2008/0163764 A1* | 7/2008 | Payen | A47J 37/043 |
| | | | 99/447 |

FOREIGN PATENT DOCUMENTS

| CN | 101138347 A | 3/2008 |
| CN | 203776010 U | 8/2014 |
| CN | 109663440 A | 4/2019 |
| CN | 209060799 U | 7/2019 |
| WO | 2015006891 A1 | 1/2015 |

OTHER PUBLICATIONS

International Search Report for Application No. PCT/CN2019/110291, dated Jan. 2, 2020, 2 pages.

* cited by examiner

*Primary Examiner* — Sean M Michalski
(74) *Attorney, Agent, or Firm* — Lerner David LLP

(57) ABSTRACT

A smoke evacuating fryer, comprising a fryer body, an exhaust vent, a lid engaged on the fryer body, and a frying basket and a smoke evacuating and filtering apparatus provided within the fryer body An air intake gap is provided at a location where the lid and the fryer body are joined. The smoke evacuating and filtering apparatus is provided on the fryer body (1) and abuts against the frying basket. Air introduced into the air intake gap is passed over the frying basket, filtered by the smoke evacuating and filtering apparatus and then discharged via the exhaust vent.

8 Claims, 2 Drawing Sheets

SMOKE EVACUATING FRYER

CROSS REFERENCE TO RELATED APPLICATIONS

The present application is a national phase entry under 35 U.S.C. § 371 of International Application No. PCT/CN2019/110291 filed Oct. 10, 2019, which claims priority from Chinese Patent Application No. 201811189379.X filed Oct. 12, 2018, all of which are incorporated herein by reference.

TECHNICAL FIELD

The present invention relates to the field of fryers, and more particularly to a smoke evacuating fryer.

BACKGROUND ART

With improvement of people's living standards and increase of food diversity, various cooking tools have gradually emerged, one of which is a fryer.

Fryers can quickly fry foodstuff to make delicious food and are therefore favored by adults and children. With the development of science, fryers are more and more frequently used at home. People can use fryers to cook their favorite food at home by themselves. However, in actual use, oil smoke and steam tend to cover the glass during cooking of the food, so that it is not easy for people to observe how well cooked the food is through the glass. In addition, the oil smoke generated when frying food usually seriously pollutes the indoor environment, affecting the quality of indoor air.

Therefore, it is necessary to provide a smoke evacuating fryer to solve the above-mentioned problems.

SUMMARY OF THE INVENTION

The present invention provides a smoke evacuating fryer to overcome at least one of the problems (shortcomings) mentioned above in the prior art.

In order to solve the above technical problem, a technical solution of the present invention is provided as follows: a smoke evacuating fryer comprises a fryer body, an exhaust vent, a lid engaged on the fryer body, and a frying basket provided within the fryer body; the smoke evacuating fryer further comprises a smoke evacuating and filtering apparatus;

an air intake gap is provided at a location where the lid and the fryer body are joined;

the smoke evacuating and filtering apparatus is disposed on the fryer body and abutted against the frying basket; and air introduced into the air intake gap is passed over the frying basket, filtered by the smoke evacuating and filtering apparatus and then discharged via the exhaust vent.

With the provision of the smoke evacuating and filtering apparatus, steam, grease and odors generated in the fryer can be quickly removed, thus maintaining a clean and fresh indoor environment. In addition, since the smoke evacuating and filtering apparatus is disposed on the fryer body and abutted against the frying basket, space can be effectively saved. Furthermore, in the process of smoke evacuating and filtering, the time that the air takes to pass through the smoke evacuating and filtering apparatus is extended, which facilitates odor removal in a simple and convenient way.

Further, the smoke evacuating and filtering apparatus comprises an oil smoke filter and a turbine air-guiding fan provided at an air outlet of the exhaust vent;

the fryer body is provided with a groove;

one end of the oil smoke filter is sleeved in the groove, and the other end abutted against the frying basket;

the oil smoke filter has an air inlet provided on the top of the groove, and an air outlet provided at the bottom of the groove; and the turbine air-guiding fan is in communication with the air outlet of the oil smoke filter. The air in the fryer can be sucked into the oil smoke filter by the turbine air-guiding fan, and the oil smoke filter can effectively absorb the grease and steam generated in the fryer while filtering the air.

Furthermore, the oil smoke filter comprises a stainless steel mesh and electrostatic cotton, and the electrostatic cotton is provided in the middle portion of the stainless steel mesh. With the provision of the electrostatic cotton, the steam and grease generated in the fryer during frying of the food can be filtered out, such that the fryer can achieve the effect of oil smoke-free discharging and air purifying. Moreover, since the stainless steel mesh is provided on two sides of the electrostatic cotton, the electrostatic cotton can be quickly removed and replaced in a simple and convenient way when necessary.

Further, the fryer body is provided with an air-guiding inlet, which communicates with the air inlet of the oil smoke filter. With the air-guiding inlet, air can be better guided into the oil smoke filter to obtain a better air-guiding effect.

Furthermore, an activated carbon absorption mesh is provided at the exhaust vent. With the activated carbon absorption mesh, the odors generated during frying can be removed, such that when in use, the fryer does not discharge odors generated during cooking of the food, thereby keeping air in the cooking environment fresh.

Furthermore, the lid is provided with a glass window. With the glass window, the cooking situation of the food in the frying basket can be seen clearly, which facilitates monitoring of the state of the food at any time.

Further, the air intake gap is configured at a position higher than the mounting position of the frying basket. Since the position of the air intake gap is higher than that of the frying basket, during cooking hot air will fill the space above the frying basket first; then the hot air is driven by the air entered from the air intake gap to pass through the oil smoke filter and discharged out of the fryer, thereby facilitating fast heating of the food in the fryer.

Furthermore, the position of the air intake gap is in level with the mounting position of the frying basket, so that the oil smoke generated in the frying basket when food is being fried in the frying basket can be timely discharged, thereby help to keep the air clean.

Compared with the prior art, the technical solutions of the present invention have the beneficial effects as follows:

(1) With the provision of the smoke evacuating and filtering apparatus in the smoke evacuating fryer disclosed by the present invention, steam, grease and odors generated in the fryer can be quickly removed, thus maintaining a clean and fresh indoor environment. In addition, since the smoke evacuating and filtering apparatus is provided on the fryer body and abutted against the frying basket, space can be effectively saved. Furthermore, in the process of smoke evacuating and filtering, the time that air takes to pass through the smoke evacuating and filtering apparatus is longer, so that odor removal is improved, which is simple and convenient.

(2) In the smoke evacuating fryer disclosed by the present invention, the air in the fryer can be sucked into the oil smoke filter by the turbine air-guiding fan, and the oil smoke filter can effectively absorb the grease and steam generated in the fryer during filtering of the air.

(3) With the provision of the electrostatic cotton in the smoke evacuating fryer disclosed by the present invention, the steam and grease generated in the fryer during frying of the food can be filtered out, such that the fryer achieves the effect of oil smoke-free discharging to achieve the purpose of purifying air. Moreover, since the stainless steel mesh is provided on two sides of the electrostatic cotton, the electrostatic cotton can be quickly removed and replaced in a simple and convenient way when necessary.

(4) With the provision of the activated carbon absorption mesh in the smoke evacuating fryer disclosed by the present invention, the odors generated during frying can be removed, such that when in use, the fryer does not discharge odors generated during cooking of the food, thereby keeping air in the cooking environment fresh.

Figure 1:
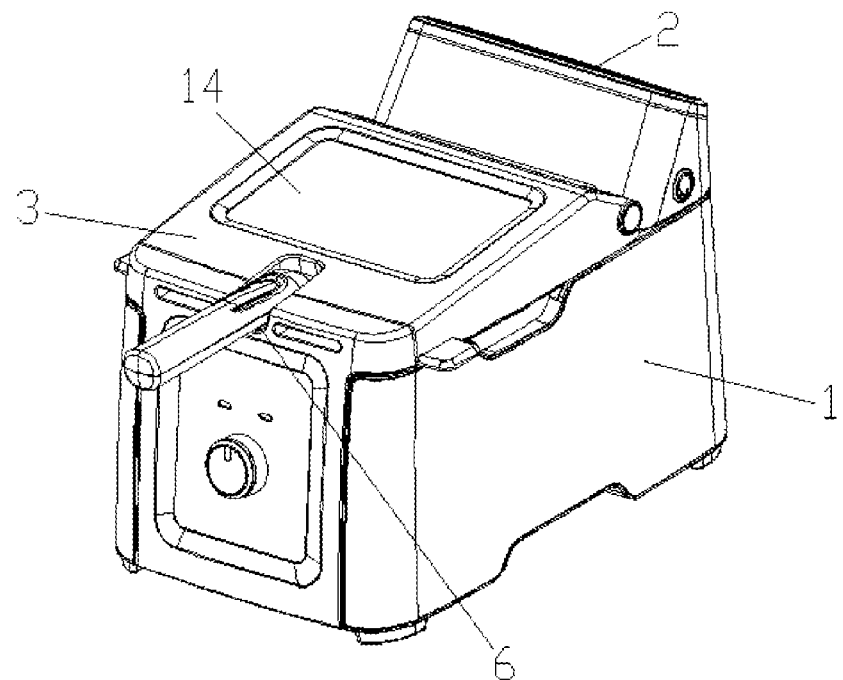
FIG. 1 is a schematic structural diagram of a smoke evacuating fryer according to the present invention.

In the figures, reference numeral 1 is used for denoting a fryer body, 2 for an exhaust vent, 3 for a lid, 4 for a frying basket, 5 for a smoke evacuating and filtering apparatus, 6 for an air intake gap, 7 for an oil smoke filter, 8 for a turbine air-guiding fan, 9 for a groove, 10 for a stainless steel mesh, 11 for an electrostatic cotton, 12 for an air-guiding inlet, 13 for an activated carbon absorption mesh, and 14 for a glass window.

DETAILED DESCRIPTION OF EMBODIMENTS

The drawings are merely for exemplary illustration and are not to be construed as limiting the present application. For better illustration of the embodiments, some components in the figures may be omitted, scaled up or scaled down, which does not represent the actual size of a product. Those skilled in the art would appreciate that some well-known structures in the figures and the descriptions thereof could be omitted.

In the description of the present invention, it should also be noted that, unless otherwise explicitly specified or limited, the terms "mounting" and "connection" should be understood in a generalized sense. For example, they may be a fixed connection, a detachable connection, or an integrated connection; they may be a mechanical connection or an electrical connection; and they may be a direct connection, or an indirect connection via an intermediate medium, or may be communication between the interiors of two elements. For those of ordinary skill in the art, the specific meanings of the terms mentioned above in the present invention should be construed according to specific circumstances. The technical solutions of the present invention are further described below with reference to the drawings and embodiments.

As shown in FIG. 1, a smoke evacuating fryer comprises a fryer body 1, an exhaust vent 2, a lid 3 engaged on the fryer body 1, and a frying basket 4 provided within the fryer body 1. The smoke evacuating fryer further comprises a smoke evacuating and filtering apparatus 5. An air intake gap 6 is provided at a location where the lid 3 and the fryer body 1 are joined. The smoke evacuating and filtering apparatus 5 is provided on the fryer body 1 and abutted against the frying basket 4. The air introduced into the air intake gap 6 is passed over the frying basket 4, filtered by the smoke evacuating and filtering apparatus 5 and then discharged via the exhaust vent 2. With the provision of the smoke evacuating and filtering apparatus 5, steam, grease and odors generated in the fryer can be quickly removed, thus maintaining a clean and fresh indoor environment. In addition, since the smoke evacuating and filtering apparatus is provided on the fryer body and abutted against the frying basket, space can be effectively saved. Furthermore, in the process of smoke evacuating and filtering, the time that air takes to pass through the smoke evacuating and filtering apparatus is extended, and improved odor removal is enabled, which is simple and convenient.

Figure 2:
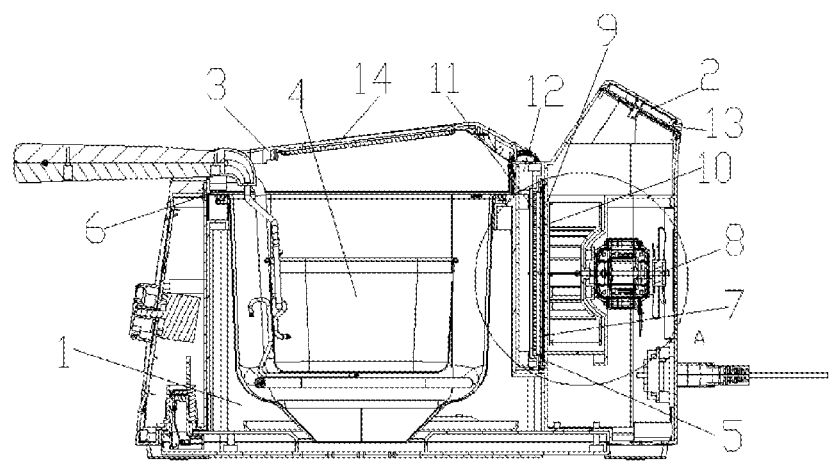
FIG. 2 is a cross-sectional view of the smoke evacuating fryer according to the present invention.
Figure 3:
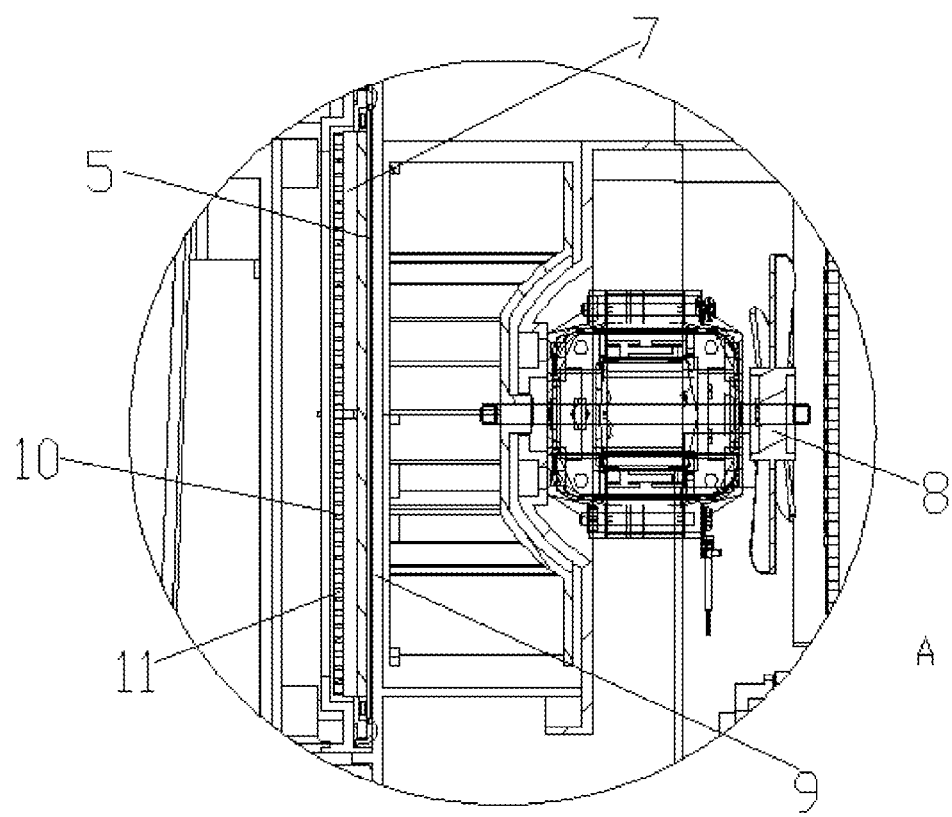
FIG. 3 is an enlarged view of a smoke evacuating and filtering apparatus (Fig. A) according to the present invention.

As shown in FIGS. 2 and 3, the smoke evacuating and filtering apparatus 5 comprises an oil smoke filter 7 and a turbine air-guiding fan 8 provided at an air outlet of the exhaust vent 2. The fryer body is provided with a groove 9. One end of the oil smoke filter 7 is sleeved in the groove 9, and the other end abutted against the frying basket 4. The oil smoke filter 7 has an air inlet provided on the top of the groove, and an air outlet provided at the bottom of the groove. The turbine air-guiding fan is in communication with the air outlet of the oil smoke filter. The air in the fryer can be sucked into the oil smoke filter by the turbine air-guiding fan, and the oil smoke filter can effectively absorb the grease and steam generated in the fryer during filtering of the air. In the present invention, the oil smoke filter 7 comprises a stainless steel mesh 10 and electrostatic cotton 11. The electrostatic cotton is provided in the middle portion of the stainless steel mesh. With the provision of the electrostatic cotton, the steam and grease generated in the fryer during frying of the food can be filtered out, such that the fryer achieves oil smoke-free discharging and air purifying. Moreover, since the stainless steel mesh is provided on two sides of the electrostatic cotton, the electrostatic cotton can be quickly removed and replaced in a simple and convenient way when necessary. In addition, the fryer body is provided with an air-guiding inlet 12, which is in communication with the air inlet end of the oil smoke filter. With the air-guiding inlet, air can be better guided into the oil smoke filter to obtain a better air-guiding effect.

In the present invention, an activated carbon absorption mesh 13 is provided at the exhaust vent 2. With the provision of the activated carbon absorption mesh 13, the odors generated during frying can be removed, such that when in use, the fryer does not discharge odors generated during cooking of the food, thereby keeping air in the cooking environment fresh. The lid is provided with a glass window 14. With the glass window, the cooking situation of the food in the frying basket can be seen clearly, which facilitates monitoring of the state of the food at any time. In the present invention, the position at which the air intake gap is provided is higher than the position at which the frying basket is mounted. Since the air intake gap is higher than the frying basket, during cooking hot air will filled the space above the frying basket first, and then driven by the air input from the air intake gap to pass through the oil smoke filter and discharged out of the fryer, thereby facilitating fast heating of the food in the fryer. Alternatively, the air intake gap may be even (i.e. level) with the mounting position of the frying basket, facilitating the timely discharging of the oil smoke generated in the frying basket when food is being fried in the frying basket, thereby help to keep the air clean.

Embodiment I

When a smoke evacuating fryer is working, air is introduced from an air intake gap provided at a location where a lid and a fryer body are joined. The air passes over the frying basket and brings away oil smoke and steam generated during cooking. A turbine fan evacuates, in a timely manner, the steam and smoke generated during frying of the food to keep a lid window clear. The steam and the oil smoke first pass through a stainless steel mesh and an electrostatic cotton filter layer in an air duct to remove the steam and grease and then pass through a top activated carbon layer to remove the odors, so as to achieve a clear window and an oil smoke-free and odorless discharging.

The positional relationship described in the figures is merely for exemplary illustration and is not to be construed as limiting the present application. Obviously, the above embodiments of the present invention are merely examples used for clearly describing the present invention, while not for limiting the implementations of the present invention. For those of ordinary skill in the art, other different forms of changes or variations could have also been made on the basis of the above-mentioned illustration. There is no need and it is impossible to exhaustively list all implementations herein. Within the spirit and principle of the present invention, any modifications, equivalent replacements, improvements, etc., shall be included within the scope of protection of the claims of the present invention.

The invention claimed is:

1. A smoke evacuating fryer comprising a fryer body, an exhaust vent, a lid engaged on the fryer body, and a frying basket provided within the fryer body, characterized in that:
   the smoke evacuating fryer further comprises a smoke evacuating and filtering apparatus;
   an air intake gap is provided at a location where the lid and the fryer body are joined;
   the smoke evacuating and filtering apparatus is provided on the fryer body and abuts against the frying basket; and
   air introduced into the air intake gap is passed over the frying basket, filtered by the smoke evacuating and filtering apparatus and then discharged via the exhaust vent.

2. The smoke evacuating fryer according to claim 1, characterized in that:
   the smoke evacuating and filtering apparatus comprises an oil smoke filter and a turbine air-guiding fan provided at an air outlet of the exhaust vent;
   the flyer body is provided with a groove;
   one end of the oil smoke filter is sleeved in the groove, and the other end abutted against the flying basket;
   the oil smoke filter has an air inlet provided on the top of the groove, and an air outlet provided at the bottom of the groove; and
   the turbine air-guiding fan is in communication with the air outlet of the oil smoke filter.

3. The smoke evacuating fryer according to claim 2, characterized in that:
   the oil smoke filter comprises a stainless steel mesh and electrostatic cotton, and the electrostatic cotton is provided in the middle portion of the stainless mesh.

4. The smoke evacuating fryer according to claim 2, characterized in that:
   the fryer body is provided with an air-guiding inlet in communication with the air inlet of the oil smoke filter.

5. The smoke evacuating fryer according to claim 1, characterized in that: the exhaust vent is provided with an activated carbon absorption mesh.

6. The smoke evacuating fryer according to claim 1, characterized in that: the lid is provided with a glass window.

7. The smoke evacuating fryer according to claim 1, characterized in that: the air intake gap is configured at a position higher than a mounting position of the frying basket.

8. The smoke evacuating fryer according to claim 1, characterized in that: the air intake gap is configured level with a mounting position of the frying basket.

* * * * *